No. 636,894. Patented Nov. 14, 1899.
A. CEJKA.
APPARATUS FOR PREVENTING WATER BLOWS IN STEAM ENGINES.
(Application filed Aug. 1, 1899.)
(No Model.) 4 Sheets—Sheet 1.

No. 636,894. Patented Nov. 14, 1899.
A. CEJKA.
APPARATUS FOR PREVENTING WATER BLOWS IN STEAM ENGINES.
(Application filed Aug. 1, 1899.)
(No Model.) 4 Sheets—Sheet 2.

No. 636,894. Patented Nov. 14, 1899.
A. CEJKA.
APPARATUS FOR PREVENTING WATER BLOWS IN STEAM ENGINES.
(Application filed Aug. 1, 1899.)
(No Model.) 4 Sheets—Sheet 3.
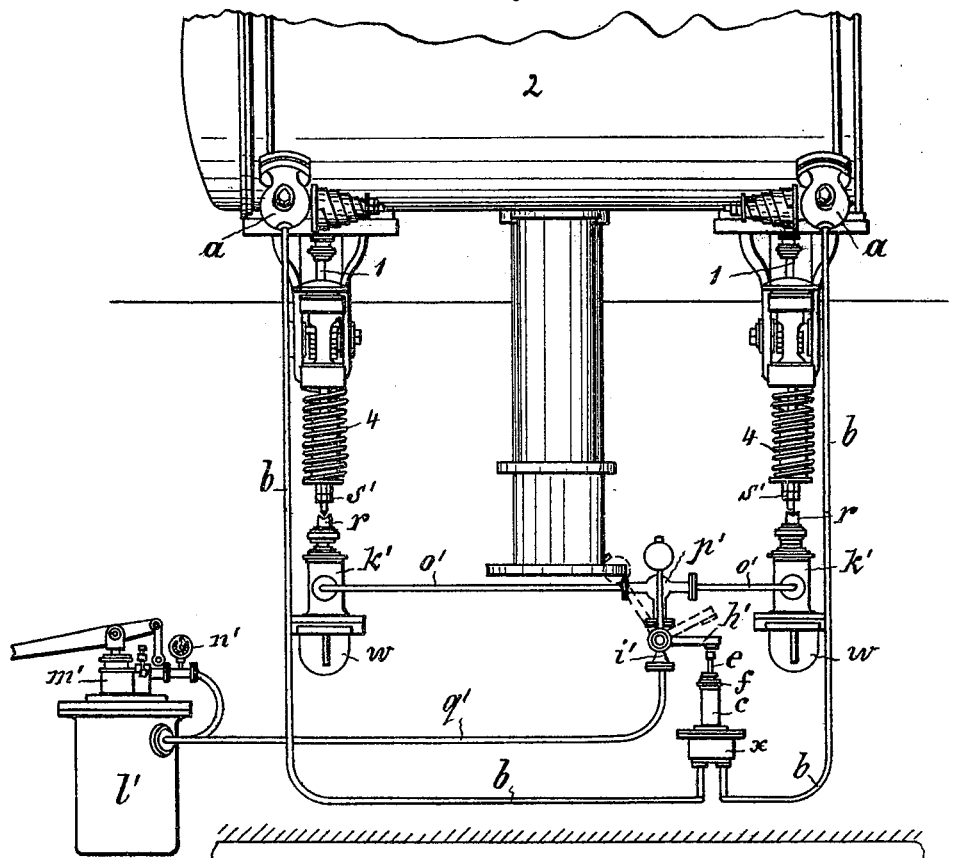
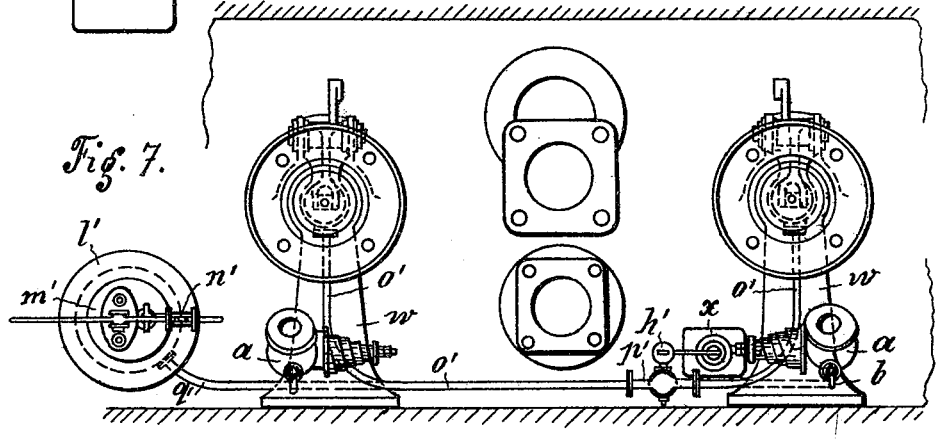

No. 636,894. Patented Nov. 14, 1899.
A. CEJKA.
APPARATUS FOR PREVENTING WATER BLOWS IN STEAM ENGINES.
(Application filed Aug. 1, 1899.)
(No Model.) 4 Sheets—Sheet 4.
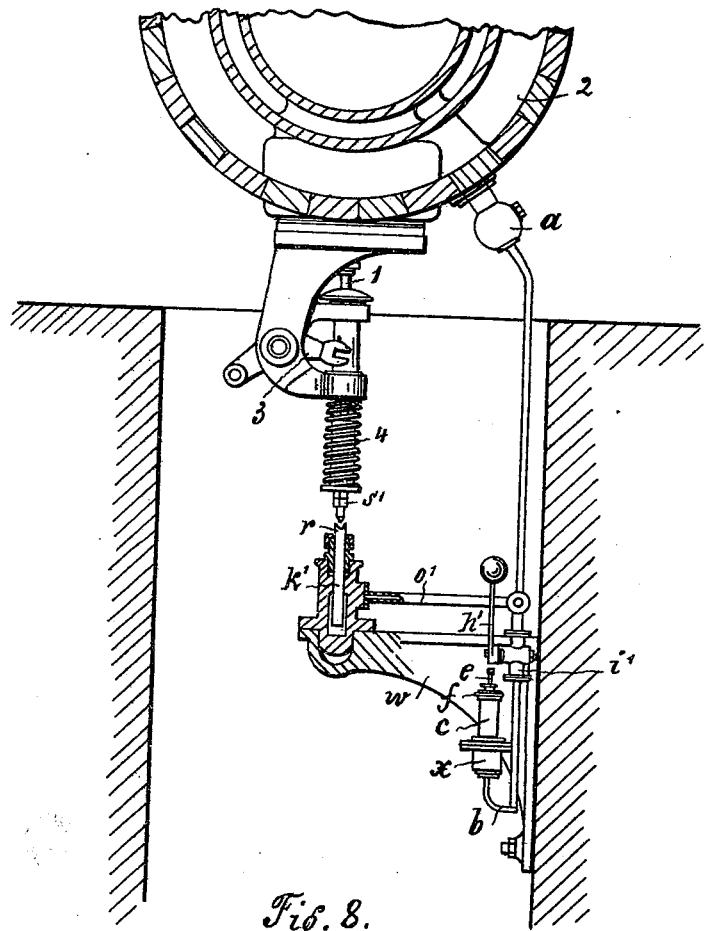
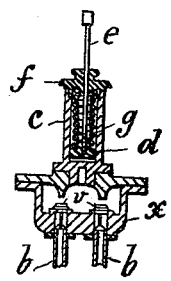
Witnesses: Inventor
Alois Cejka.
by
Atty

UNITED STATES PATENT OFFICE.

ALOIS CEJKA, OF MUNICH, GERMANY.

APPARATUS FOR PREVENTING WATER-BLOWS IN STEAM-ENGINES.

SPECIFICATION forming part of Letters Patent No. 636,894, dated November 14, 1899.

Application filed August 1, 1899. Serial No. 725,773. (No model.)

*To all whom it may concern:*

Be it known that I, ALOIS CEJKA, a subject of the King of Bavaria, and a resident of Munich, Bavaria, Germany, have invented certain new and useful Improvements in Apparatus for Preventing Water-Blows in Steam-Engines; and I do hereby declare the following to be a full, clear, and exact description of the invention, such as will enable others skilled in the art to which it appertains to make and use the same.

Apparatus for preventing water-blows in steam-engines that depend on the shutting of the steam-admission valves are actually conducive to the production of water-blows by the sudden entry of water into the steam-cylinder and increase of the pressure therein, because the engines continue to run in consequence of the inertia and the cylinders are thereby filled with water, and before the engines are brought to a standstill this may cause all manner of disarrangement. In contradistinction to this, apparatus according to this invention brings about, at the moment when water suddenly enters the steam-cylinder or when the pressure in the steam-cylinder rises, the simultaneous opening of both exhaust-valves by the operation of the pistons of two pressure-cylinders or of one pressure-cylinder which communicate or communicates with the ends of the steam-cylinder. In one example the motion of the pistons of two pressure-cylinders, each of which is in communication with one end of the steam-cylinder, releases weights by means of which the two exhaust-valves are simultaneously opened. In another example, in which there is only one pressure-cylinder, which communicates with the ends of the steam-cylinder by means of two conduits, each provided with a non-return valve, a cock or the like is reversed by the piston of this pressure-cylinder, in consequence of which the pressure from an air vessel passes over into auxiliary pressure-cylinders the pistons of which open both exhaust-valves.

Figure 1:
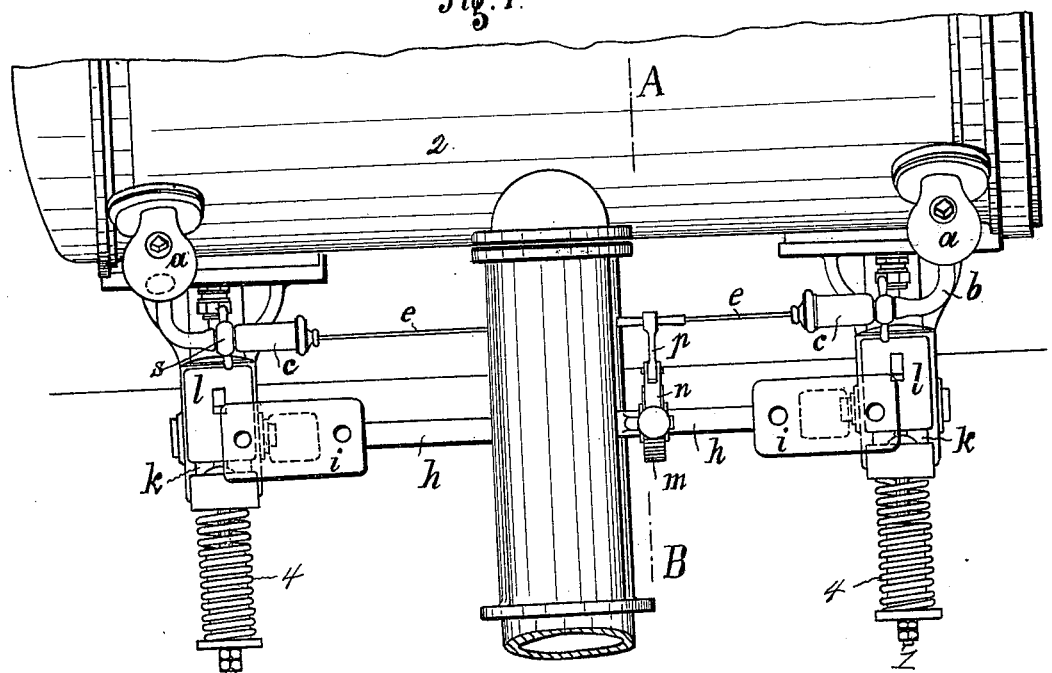
Figure 3:
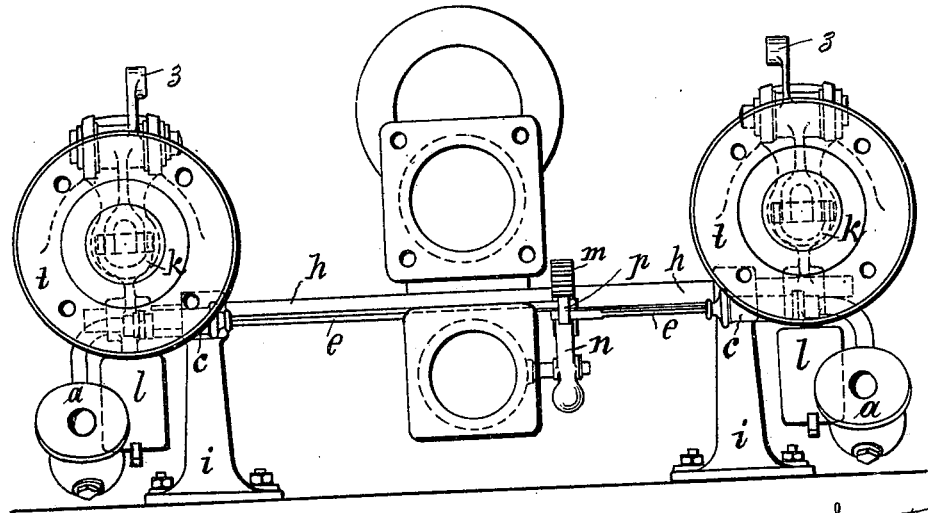
Figure 2:
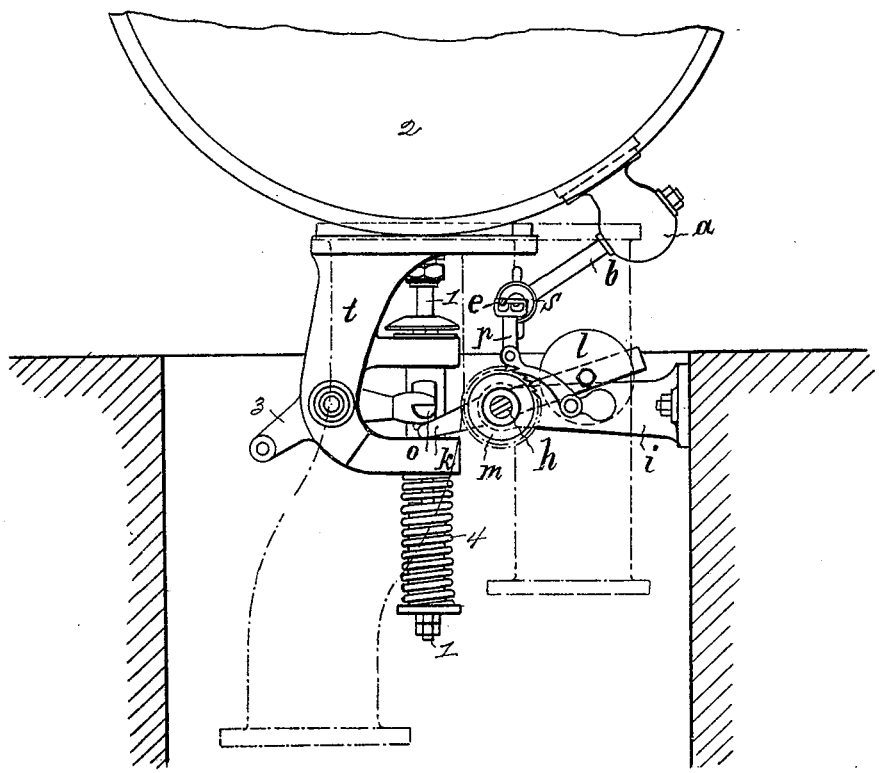
Figure 4:
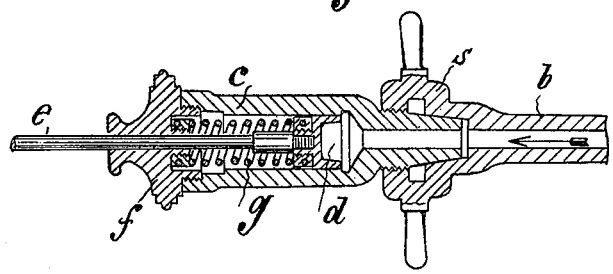

The first example is illustrated by Figures 1 to 4, inclusive, of which Fig. 1 is a side elevation; Fig. 2, an end elevation, partly in section, according to the line A B of Fig. 1; Fig. 3, a plan of the apparatus without the steam-cylinder to the under side of which the apparatus is fixed; and Fig. 4, a section of one of the small pressure-cylinders and its piston. The second example is illustrated by Figs. 5 to 8, inclusive, of which Fig. 5 is a side elevation of the apparatus; Fig. 6, a cross-section with part in elevation; Fig. 7, a plan of the apparatus without the steam-cylinder, and Fig. 8 a vertical section of the small pressure-cylinder.

The rods of the exhaust-valves of the steam-cylinder 2 are marked 1. The exhaust-valves are opened through the intermediary of the rods 1 and levers 3, engaging therewith, in the well-known way by means of the valve mechanism and are closed by springs 4, located on the lower parts of the rods 1.

In the example shown in Figs. 1 to 4, inclusive, bent tubes $b$ are connected to the junction-pieces $a$, which are each provided with a through-passage and are fixed to the ends of the steam-cylinder 2. The bent tubes $b$ are each joined by a screw arrangement $s$ to a small pressure-cylinder $c$, in which moves a piston $d$, whose rod $e$ is guided by the cover $f$ of the cylinder $c$ and has a wedge-shaped end. To the cover $f$ of each of the cylinders $c$, as well as to the corresponding piston $d$, there is fastened a helical spring $g$, which can easily be exchanged for a stronger or a weaker one and which balances the steam-pressure acting on the piston $d$, Fig. 4. At a suitable distance from the valve-bearers $t$ a shaft $h$ is mounted to rotate in two brackets $i$, and keyed on each end of it, exactly opposite to the center of the corresponding valve-bearer, is a forked lever $k$, having a counterweight $l$, the two counterweights being adapted to lift the exhaust-valves. At one side of the steam-admission pipe a ratchet-wheel $m$ is located, which is held back by a detent $n$, which is balanced by a counterweight, and to the upper end of which there is jointed a rod $p$, having a slot that is entered by the wedge-shaped ends of the piston-rods $e$. As soon as the pressure in the steam-cylinder begins to rise in consequence of a sudden entry of a certain quantity of water, caused by the overfeeding of the boiler, the failure of the air-pump, or the like, the piston $d$ of the cylinder $c$ is moved forward, and the wedged surfaces at the ends of the piston-rods $e$ raise the rod $p$ and thereby disengage the detent $n$, in consequence of which the two counterweights $l$ drop, and the forked levers $k$ press against the bolts $o$ on the valve-rods and simultaneously open both exhaust-valves. The latter then remain open until the engine is once more in order. The quantity of water which may perchance have accumulated in the cylinder can without danger pass out with the steam through both exhaust-valves unhindered. The engine stops after a few revolutions, the number of which depends upon the load, and thus every danger is guarded against when this apparatus is used. In order that the engine may be started again without great loss of time, the stop-valve is first closed, the engine and the air-pump gear are closely examined, and the mechanism is restored to its original position, whereupon the engine can be started again.

In the example shown in Figs. 5 to 8, inclusive, the junction-pieces $a$ at the ends of the steam-cylinder are connected by tubes $b$ with a casing $x$, which contains the non-return valves $v$ and carries the main pressure-cylinder $c$. The piston-rod $e$ of the piston $d$ of this cylinder, which is led through the cover $f$, is somewhat enlarged at the top, and a spring $g$, which is placed between the cover and the piston and which can be easily exchanged for a stronger or a weaker one, balances the steam-pressure. From the compressed-air vessel $l'$, which carries on the top a force-pump $m'$, which is partly filled with oil and can be set to any desired pressure visible on the pressure-gage $n'$, a pressure-pipe $q'$ leads to a cock $i'$, upon the plug of which is a bent lever $h'$, one arm of which lies over the piston-rod $e$ and the other arm of which carries a weight. The cock $i'$, for which another distributing device may be substituted, is connected by a T-shaped pipe $p'$ and two pipes $o'$ with the auxiliary pressure-cylinders $k'$, which are supported by brackets $w$, and the plungers $r$ of which are directly under the rods $s'$ of the exhaust-valves. If the pressure rises in consequence of a sudden entry of water into the cylinder, the respective non-return valve $v$ opens, the bent lever $h'$ is thrown over by the piston-rod $e$ of the pressure-cylinder $c$, the cock $i'$ is opened, and pressure from the air-vessel $l'$ comes under the pistons or plungers $r$ of the auxiliary cylinders $k'$, in consequence of which both exhaust-valves are simultaneously opened. The pressure on their rods causes these valves to remain open until the cock $i'$ is again closed and the pressure removed.

The apparatus shown in Figs. 1 to 4, as well as that shown in Figs. 5 to 8, can be easily adapted to be worked by hand, so as to prevent accidents.

Having now particularly described my invention, what I claim as new therein, and desire to secure by Letters Patent, is—

1. The combination with the power-cylinder of a steam-engine, of an exhaust port and valve at each end thereof, and means unseating both valves when the pressure on one or the other side of the piston rises above normal working pressure, for the purposes set forth.

2. The combination with the power-cylinder of a steam-engine and an exhaust port and valve at each end of said cylinder, of a pressure-cylinder in communication with opposite ends of the piston-chamber in said power-cylinder, means for balancing normal working pressure acting upon the pressure-cylinder piston, and means controlled by the latter, unseating both exhaust-valves, when the pressure on said pressure-cylinder piston exceeds the normal working pressure, for the purpose set forth.

3. The combination with the power-cylinder of a steam-engine, an exhaust port and valve at each end of said power-cylinder, a main pressure-cylinder in communication with opposite ends of the piston-chamber in the power-cylinder, the piston of the last-named cylinder, and means balancing the normal working pressure acting on said piston; of auxiliary power-cylinders, their pistons, a source of supply of fluid under pressure connected with said auxiliary pressure-cylinders, a valve in said connection controlled by the movements of the main-pressure-cylinder piston, said auxiliary-pressure-cylinder pistons operating when displaced to unseat the exhaust-valves, for the purpose set forth.

4. The combination with the power-cylinder of a steam-engine, the exhaust-valves and the mechanism controlling said valves; of means operating independently of said mechanism, under certain pressure conditions in the cylinder, to simultaneously unseat both exhaust-valves, for the purposes set forth.

5. The combination with the power-cylinder of a steam-engine, the exhaust-valves and the mechanism controlling said valves; of means operating automatically and independently of said mechanism, under certain pressure conditions in the cylinder to simultaneously unseat both exhaust-valves, for the purposes set forth.

6. The combination with the power-cylinder of a steam-engine, the exhaust-valves and the mechanism controlling said valves; of a pressure-cylinder in communication with the power-cylinder at both ends, the piston of said pressure-cylinder, means acting on said piston to counterbalance normal pressures thereon, and means actuated by the piston when displaced by abnormal pressures in said power-cylinder to simultaneously unseat both exhaust-valves independently of their controlling mechanism, for the purposes set forth.

7. The combination with the power-cylinder of a steam-engine, the exhaust-valves, and the mechanism controlling said valves; of a main pressure-cylinder in communication with the power-cylinder at both ends, a checkvalve in said communications, the pressure-cylinder piston, means balancing the power-cylinder pressures thereon, auxiliary pressure-cylinders, their pistons operating when displaced to unseat both exhaust-valves simultaneously, a source of supply of a fluid under pressure connected with both auxiliary pressure-cylinders, and a valve in said connection opened by the main-pressure-cylinder piston when displaced by abnormal pressures in the power-cylinder, for the purposes set forth.

In testimony that I claim the foregoing as my invention I have signed my name in presence of two subscribing witnesses.

ALOIS CEJKA.

Witnesses:
  BENJ. NUSBAUM,
  EMIL HENZEL.